United States Patent
Park

(10) Patent No.: US 7,336,783 B2
(45) Date of Patent: Feb. 26, 2008

(54) CRYPTOGRAPHIC SYSTEMS AND METHODS SUPPORTING MULTIPLE MODES

(75) Inventor: Tae Gon Park, Kyunggi-do (KR)

(73) Assignee: Samsung Electronics, C., Ltd. (KR)

( * ) Notice: Subject to any disclaimer, the term of this patent is extended or adjusted under 35 U.S.C. 154(b) by 715 days.

(21) Appl. No.: 10/721,398

(22) Filed: Nov. 25, 2003

(65) Prior Publication Data

US 2004/0146158 A1    Jul. 29, 2004

(30) Foreign Application Priority Data

Jan. 24, 2003  (KR) .................. 10-2003-0004806
Jul. 31, 2003  (KR) .................. 10-2003-0053262

(51) Int. Cl.
*H04K 1/00*    (2006.01)
(52) U.S. Cl. ..................... 380/28; 380/29; 380/33; 380/37; 380/42; 380/43; 713/161
(58) Field of Classification Search ................ 380/37, 380/42, 28, 262, 29, 33, 43; 713/161, 189
See application file for complete search history.

(56) References Cited

U.S. PATENT DOCUMENTS

| | | | | |
|---|---|---|---|---|
| 4,907,275 | A * | 3/1990 | Hashimoto | 713/161 |
| 6,704,871 | B1 * | 3/2004 | Kaplan et al. | 713/192 |
| 7,092,525 | B2 * | 8/2006 | Matchett et al. | 380/29 |
| 7,095,850 | B1 * | 8/2006 | McGrew | 380/42 |

* cited by examiner

*Primary Examiner*—T. B. Truong
(74) *Attorney, Agent, or Firm*—F. Chau & Assoc., LLC

(57) ABSTRACT

Cryptographic systems and methods that support multiple modes of operation, such as CBC, CTR and/or CCM modes. In one aspect, a method for encrypting data includes reading a plaintext data block from a memory, storing the plaintext data block in an input buffer, encrypting the plaintext data block in the input buffer using a first mode to generate a first ciphertext, storing the first ciphertext in an output buffer, encrypting the plaintext data block in the input buffer using a second mode to generate a second ciphertext. For example, in a CCM mode of operation wherein the first mode is a CTR (counter) mode and the second mode is a CBC (cipher block chaining) mode, the block of plaintext that is initially read from memory and stored in the data input register is applied to both the CTR and CBC modes, thereby reducing a number memory read operations as in conventional CCM modes.

13 Claims, 11 Drawing Sheets

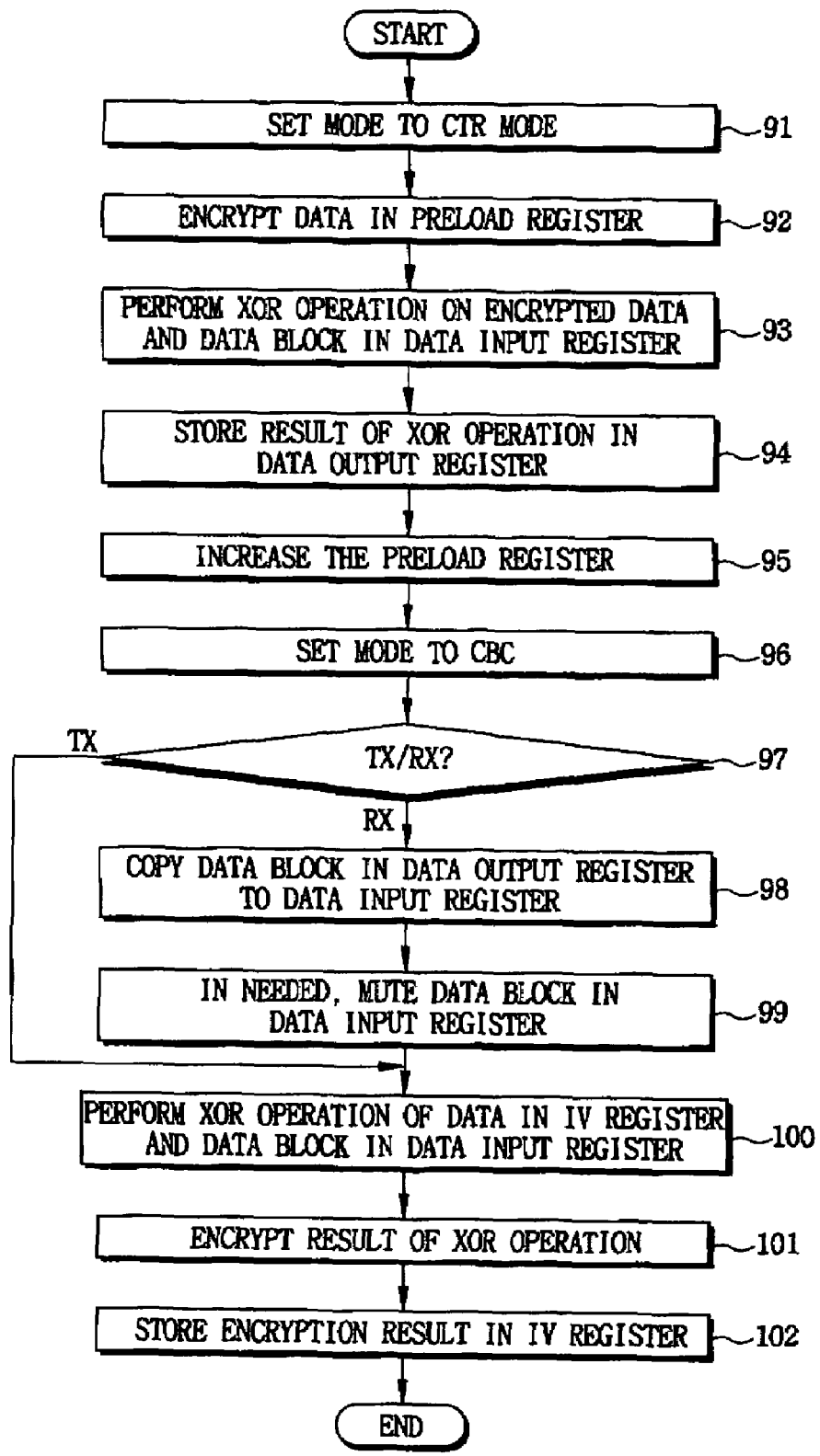

CRYPTOGRAPHIC SYSTEMS AND METHODS SUPPORTING MULTIPLE MODES

CROSS-REFERENCE TO RELATED APPLICATION

This application claims priority to Korean Patent Application No. 2003-53262, filed on Jul. 31, 2003, and Korean Patent Application No. 2003-4806, filed on Jan. 24, 2003, in the Korean Intellectual Property Office.

TECHNICAL FIELD

The present invention relates generally to systems and methods for data cryptography, and more particularly, to cryptographic systems and methods that support multiple modes of operation, wherein such modes include efficient CCM (Counter with Block Chaining-Message Authentication Code) modes for encrypting and decrypting data at increased rates.

BACKGROUND

Typically, cryptography is used for data storage and/or communication to ensure the security/confidentiality of data. For example, in a communications system, plaintext data can be encrypted (encoded) at a transmission node to generate ciphertext, and the ciphertext can be transmitted to a receiver node, wherein the ciphertext is decrypted (decoded) to obtain the plaintext data. The encryption of data assures the confidentiality of the transmitted data. In certain applications, it is also desirable to implement a cryptographic scheme that enables data authentication as well as data confidentiality.

For example, one cryptographic protocol that provides assurance of the confidentiality and authenticity of data is CCM (Counter with Block Chaining-Message Authentication Code). In general, CCM is mode of operation of a symmetric key block cipher, which combines the techniques of the CTR (Counter) mode for data confidentiality and the CBC-MAC (Cipher Block Chaining-Message Authentication Code) mode for data authentication and integrity. In one proposed and emerging standard, CCM is based on a symmetric key block cipher algorithm whose block size is 128 bits, such as the AES (Advanced Encryption Standard) protocol, for use within the proposed IEEE 802.11i standard for WLAN (wireless local area network) applications.

In general, CCM mode includes a CCM encryption process and a CCM decryption process, wherein the CCM encryption and CCM decryption use the same cryptographic key and only the block cipher encryption function (i.e., the forward cipher function). More specifically, for a given message (e.g., data packet having a header and payload), CCM encryption comprises applying a CBC mode to the header and payload and a nonce (unique value (bit string)) which is assigned to the header/payload pair) to generate a MAC (message authentication code), and applying CTR mode to encrypt the MAC and to encrypt the payload, to thereby generate a ciphertext.

On the other hand, CCM decryption comprises applying CTR mode to decrypt the ciphertext (recover the MAC and payload), and applying CBC mode to generate a MAC, and comparing the generated MAC with the received MAC to authenticate the message.

FIG. 1 is a flow diagram of a conventional CCM mode of operation. More specifically, FIG. 1 illustrates a conventional CCM mode of operation for encrypting one block of data (i.e., block of plaintext). In the following discussion, it is assumed that the data block has a block size equal to 128 bits (16 bytes), which is the size of the block cipher (e.g., AES). Initially, a block of data (plaintext block) will be read from memory (e.g., hard disk memory) (step 10). Assuming an ideal process, the read process will take at least 7 clock cycles to read 16 bytes (128 bits). Next, the plaintext block will be encrypted using the CTR mode (step 11), which requires at least 10 clock cycles in an ideal case. The encrypted block will then be stored in memory (step 12), which requires at least 7 clock cycles in an ideal case.

Next, the same plaintext block (i.e., same plaintext block used for the CTR encryption) will be read from the memory again (step 13), which requires at least 7 clock cycles in an ideal case. The plaintext block will then be encrypted using CBC-MAC mode (step 14), which requires at least 10 clock cycles in an ideal case. The encrypted block is then stored (written) to the memory (step 15), which requires at least 7 clock cycles in an ideal case.

As described above, a conventional method as depicted in FIG. 1 requires, in an ideal case, at least 48 clock cycles for processing one block of data (one plaintext block) for a CCM encryption mode. The conventional encryption method of FIG. 1, however, includes redundant steps that render such method inefficient. For instance, the same plaintext block is read from memory two times, once for CTR encryption (step 10) and once for CBC encryption (step 13), which makes the second memory read operation (step 13) redundant. Furthermore, since the MAC value that is used for CCM is the accumulated MAC value that is obtained after the last plaintext block is processed, the write process (step 15) is not necessary for the CBC encryption process for each block, which further adds to the redundancy of the method of FIG. 1.

SUMMARY OF THE INVENTION

Exemplary embodiments of the invention include cryptographic systems and methods for providing data encryption and security. Exemplary embodiments of the invention include cryptographic systems and methods that support multiple modes of operation, such as CBC, CTR and/or CCM modes. Exemplary embodiments of the invention further include cryptographic systems and methods that provide efficient CCM modes of operation, which provide increased encryption/decryption rates by reducing the number of clock cycles for performing encryption/decryption, as compared to the conventional cryptographic methods.

In one exemplary embodiment of the invention, a method for encrypting data comprises reading a plaintext data block from a memory and storing the plaintext data block in an input buffer. The plaintext data block in the input buffer is encrypted using a first mode to generate a first ciphertext, which is stored in an output buffer. The plaintext data block in the input buffer is then encrypted using a second mode to generate a second ciphertext. In other embodiments, the second ciphertext can be stored in a buffer such as the output buffer or any other buffer, depending on the mode of operation. In one embodiment wherein the method comprises a CCM mode of operation, the first mode is a CTR (counter) mode and the second mode is a CBC (cipher block chaining) mode. In the exemplary CCM embodiment, the block of plaintext that is initially read from memory and stored in the data input register is applied to both the CTR and CBC modes, thereby reducing a number memory read operations.

In another exemplary embodiment of the invention, a method for decrypting data comprises reading a block of ciphertext from a memory and storing the block of ciphertext in an input buffer. The block of ciphertext in the input buffer is decrypted using a first mode to generate a plaintext, which is stored in the input buffer, an output buffer or both, for example. The plaintext in the input buffer or the output buffer is then encrypted using a second mode to generate a ciphertext. In one embodiment of the invention wherein the method comprises a CCM mode of operation, the first mode is a CTR (counter) mode and the second mode is a CBC (cipher block chaining) mode. In the exemplary CCM embodiment, the block of plaintext that is generated as a result of the CTR (decryption) mode is applied to the CBC mode for generating a MAC, thereby reducing a number memory read operations. In yet another exemplary embodiment, the method includes converting one or more bits of the plaintext to logic level "0" before encrypting the plaintext using the second mode.

These and other exemplary embodiments, aspects, features and advantages of the present invention will be described and become apparent from the following detailed description of exemplary embodiments, which is to be read in connection with the accompanying drawings.

BRIEF DESCRIPTION OF THE DRAWINGS

FIG. 9 is a flow diagram illustrating a CCM mode of operation according to an exemplary embodiment of the invention.

DETAILED DESCRIPTION OF EXEMPLARY EMBODIMENTS

Exemplary embodiments of the invention include cryptographic systems and methods for providing data encryption and security. Exemplary embodiments of the invention include cryptographic systems and methods that support multiple modes of operation, such as CBC, CTR and/or CCM modes. Exemplary embodiments of the invention further include cryptographic systems and methods that provide efficient CCM modes of operation, which provide increased encryption/decryption rates by reducing the number of clock cycles for performing encryption/decryption, as compared to the conventional cryptographic methods.

Figure 2:
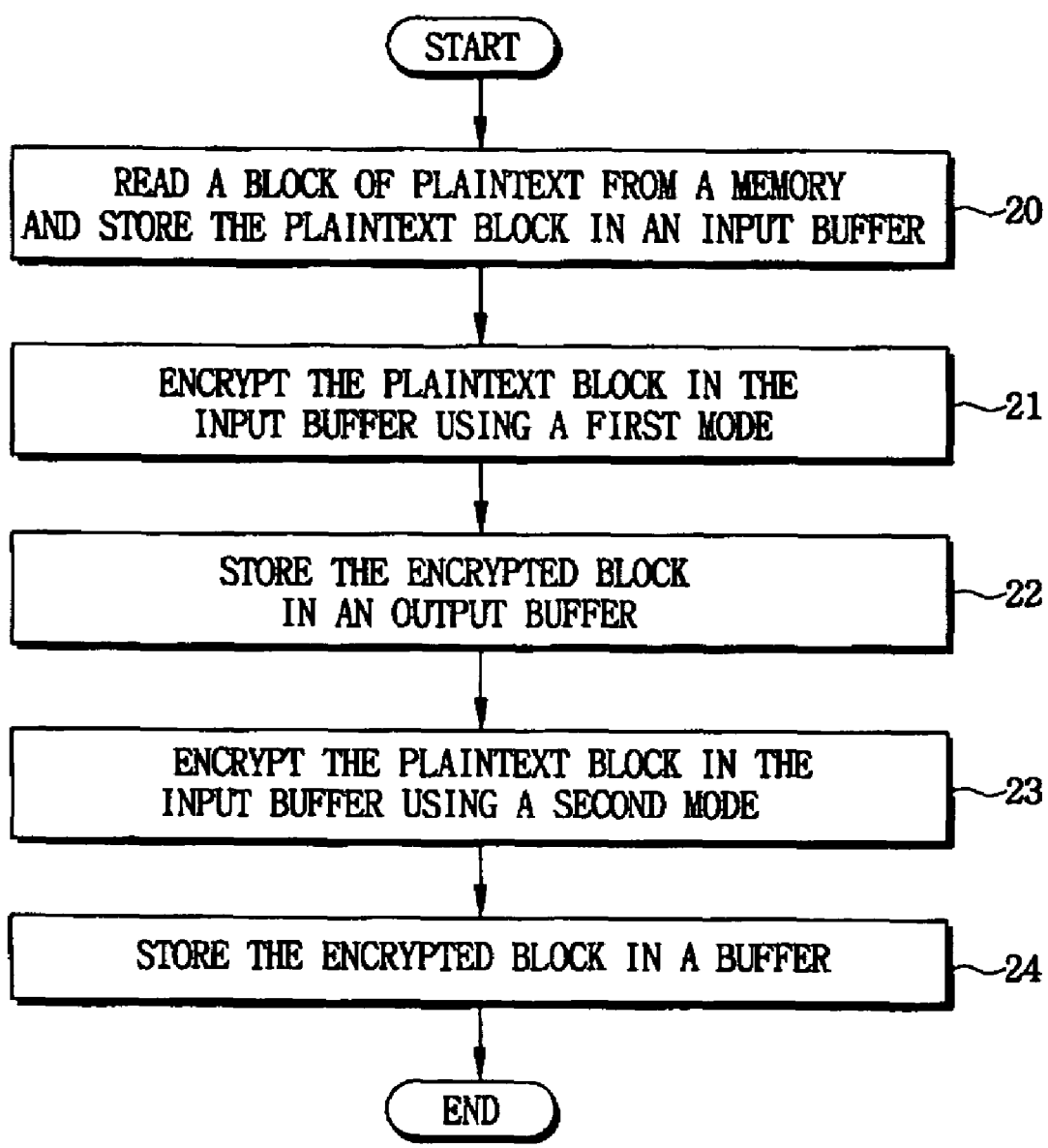
FIG. 2 is a flow diagram illustrating a method for encrypting a data block according to an exemplary embodiment of the invention.

For example, FIG. 2 is a flow diagram illustrating a cryptographic method according to an exemplary embodiment of the present invention. More specifically, FIG. 2 depicts a method for encrypting a block of data, according to an exemplary embodiment of the invention. Initially, a block of plaintext is read from a memory (e.g., persistent storage such as a hard disk, etc.), and stored in, e.g., an input buffer (step 20). The block of plaintext in the input buffer is then encrypted using a first mode to generate a first block of ciphertext (step 21) and the first block of ciphertext is stored in an output buffer (step 22). The block of plaintext in the input buffer is encrypted again using a second mode to generate a second block of ciphertext (step 23). The second block of ciphertext can be stored in a buffer (step 24) such as the output buffer or any other buffer, depending on the mode of operation.

In one exemplary embodiment of the invention, a CCM encryption mode of operation can be implemented using the method of FIG. 2, wherein the first mode is a CTR (counter) mode and wherein the second mode is a CBC (cipher block chaining) mode. In such exemplary embodiment, a block of plaintext is read from memory once (step 20) and applied for at least two modes of operation, e.g., CTR and CBC modes. This is to be contrasted with the conventional method of FIG. 1, wherein the same block of plaintext is read from memory twice (steps 10 and 13 in FIG. 1). Furthermore, in a CCM mode based on the exemplary method of FIG. 2, the result of the CBC mode (second mode) is stored in a buffer (step 24), which is to be contrasted with the conventional method of FIG. 1, wherein the result of the CBC is written to the memory (step 15 of FIG. 1). Indeed, in one exemplary embodiment of the invention for a CCM mode, the result of the CBC mode for a given block of data is accumulated in a buffer (as opposed to being written to the memory), and used as an input to encrypt a next data block. After the last plaintext block is processed, the final accumulated value represents a MAC.

Figure 1:
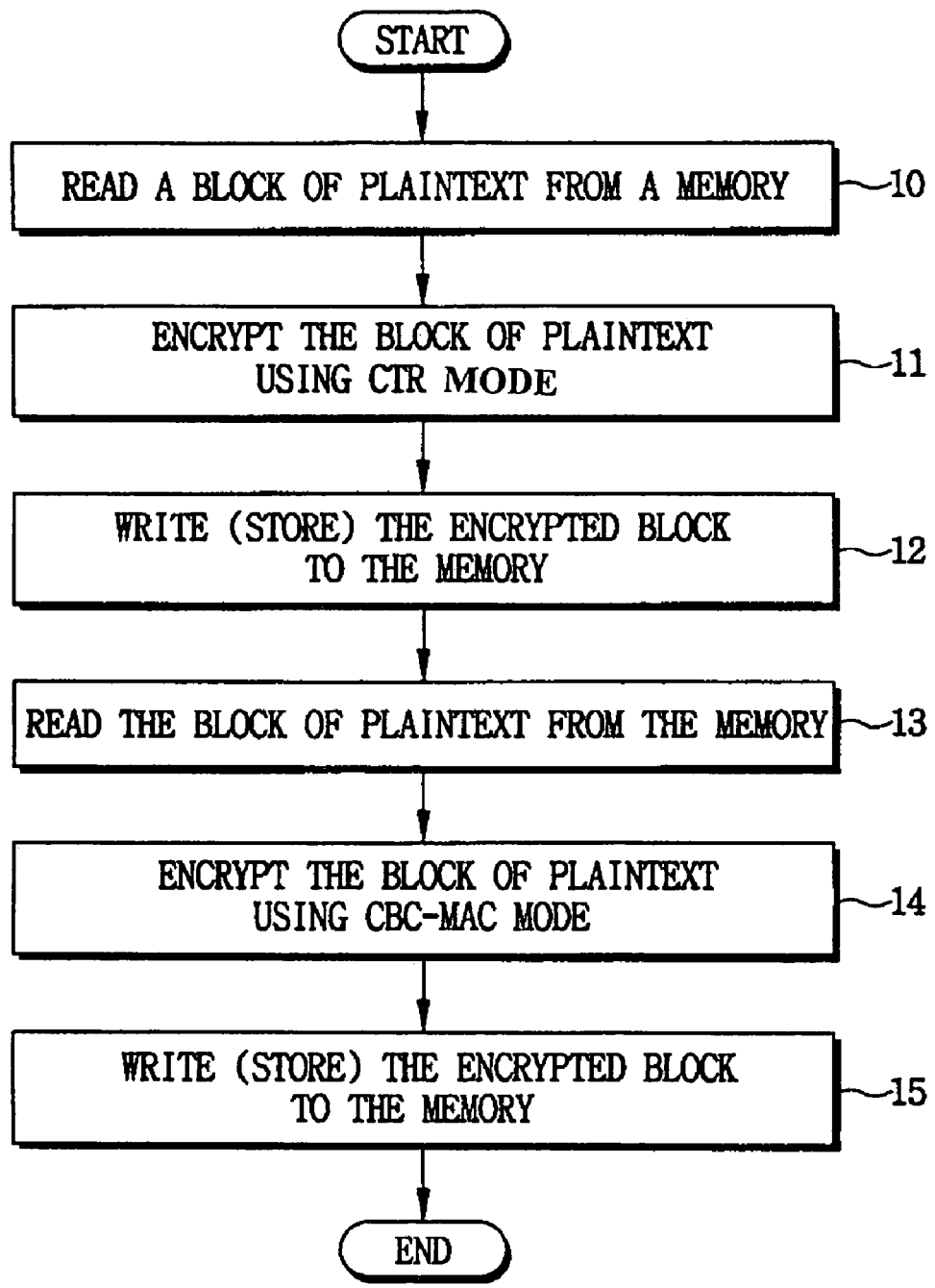
FIG. 1 is a flow diagram illustrating a conventional CCM mode of operation.

Therefore, the exemplary method of FIG. 2 provides an increased encryption rate as compared to conventional methods. By way of example, assume that both FIG. 1 and FIG. 2 depict CCM modes that implement a block cipher having a block size of 128 bits. As discussed above, the exemplary method of FIG. 2 eliminates at least a single read and write operation from/to the memory as compared to the method of FIG. 1 (e.g., steps 13 and 15), thereby reducing the clock cycles by at least (ideally) 14 clock cycles in the above example. In the ideal case, this provides approximately a 30% reduction in the number of clock cycles needed for processing a block of data in CCM mode. Moreover, taking into consideration system bus contention, the exemplary method of FIG. 2 can provide approximately a 50% reduction in the number of clock cycles needed for processing a block of data in CCM mode, as compared to the conventional method of FIG. 1.

Figure 3:
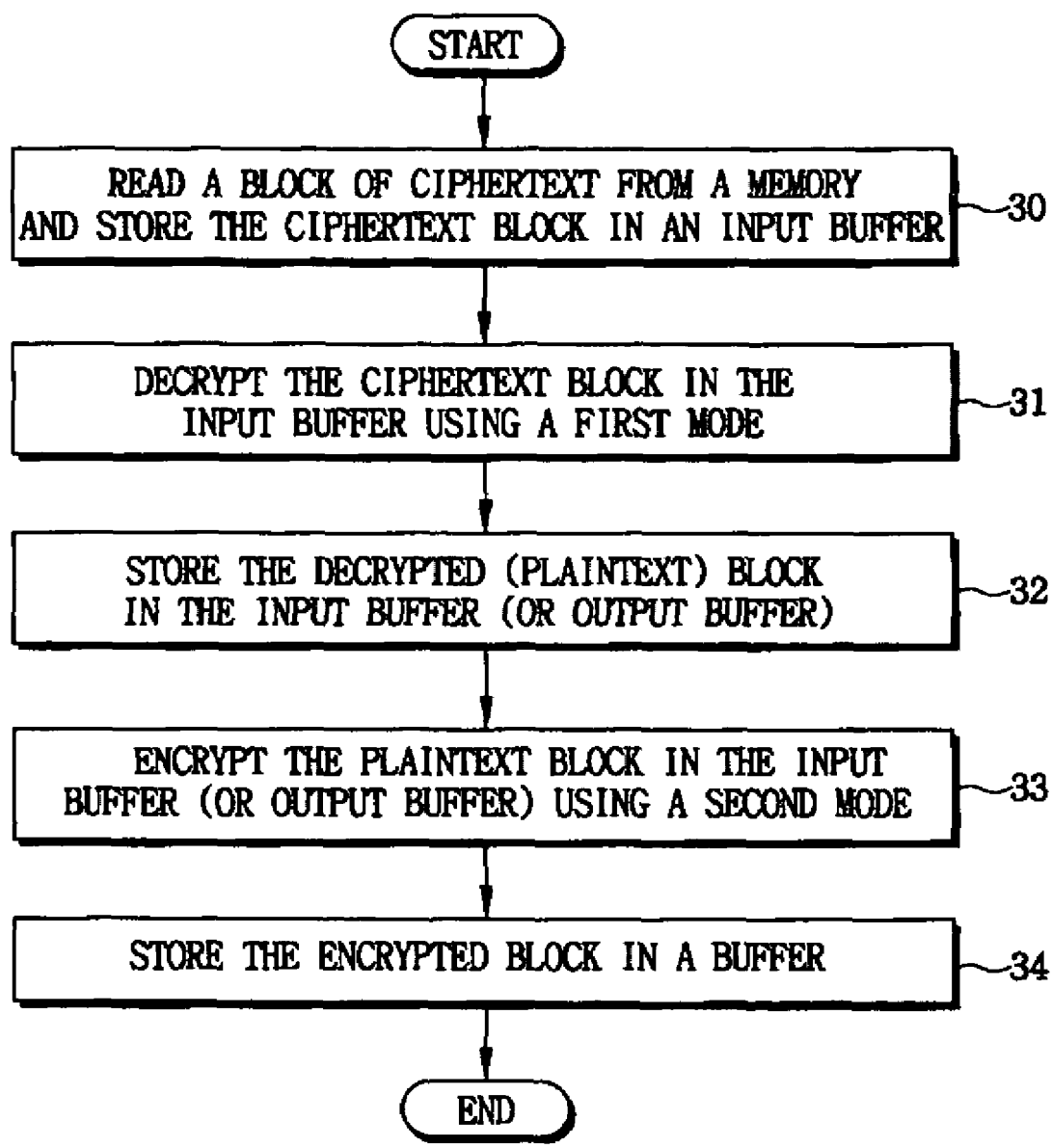
FIG. 3 is a flow diagram of a method for decrypting a block of data according to an exemplary embodiment of the invention.

FIG. 3 is a flow diagram illustrating a cryptographic method according to another exemplary embodiment of the invention. More specifically, FIG. 3 is a method for decrypting a block of data according to an embodiment of the invention. Initially, a block of ciphertext is read from a memory (e.g., persistent storage, hard disk, etc.) and stored in an input buffer (step 30). Then, the block of ciphertext in the input buffer is decrypted using a first mode to generate a block of plaintext (step 31). The block of plaintext is then stored in the input buffer (or an output buffer or both) (step 32) and the plaintext in the input buffer (or the output buffer) is encrypted using a second mode to generate a block of ciphertext (step 33). The block of ciphertext can be stored in a buffer (step 34) such as the output buffer or any other buffer, depending on the mode of operation.

In one exemplary embodiment of the invention, a CCM decryption mode of operation can be implemented using the method of FIG. 3, wherein the first mode is a CTR mode and wherein the second mode is a CBC mode. In such exemplary embodiment, a memory read access (step 30) is performed once to obtain a block of ciphertext for the CTR decryption and the resulting block of plaintext (the result of the CTR decryption) is applied in the CBC mode to determine a MAC. In other words, the block of plaintext for the CBC mode is not read from memory, but furthermore, in a CCM mode based on the exemplary method of FIG. 3, the result of the CBC mode (second mode) is stored (accumulated) in a buffer (step 34), as opposed to being written to memory for each data block. Therefore, as with the exemplary encryption method of FIG. 2, the exemplary decryption method of FIG. 3 eliminates/reduces redundancy of memory read/write operations, to thereby obtain increased decryption rates.

Figure 4:
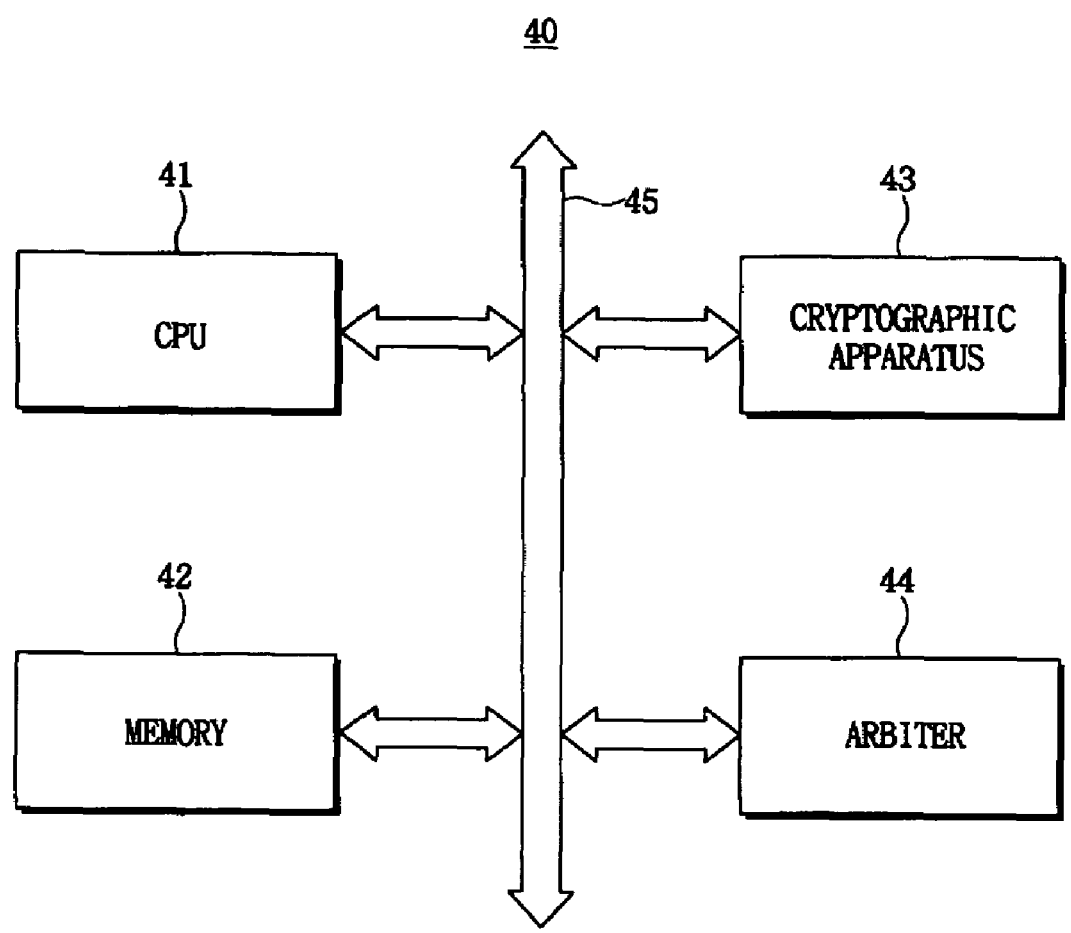
FIG. 4 is a schematic block diagram of a communications system having a cryptographic system, according to an exemplary embodiment of the present invention.

FIG. 4 is a high-level diagram illustrating a communications system according to an exemplary embodiment of the invention. In FIG. 4, a communications system (40) comprises a CPU (central processing unit) (41), a memory (42) (e.g., persistent hard disk memory), a cryptographic apparatus (43), an arbiter (44) and a system bus (45). It is to be understood that the communications system (40) depicted in FIG. 4 can be implemented with various devices and platforms, such as a desktop computer, a portable computer, a PDA, a mobile communications terminal, etc. The memory (42) persistently stores, for example, cryptographic applications that are executed by the CPU (41) to control the cryptographic apparatus (43). In addition, the memory (42) can store plaintext, ciphertext, and other data, for example. The arbiter (44) arbitrates among various masters (e.g., the CPU (41), the cryptographic apparatus (43), etc.) for use of the system bus (45) for performing DMA (direct memory access) of the memory (42). The cryptographic apparatus (43) implements, for example, the cryptographic systems and methods described herein. For example, the cryptographic apparatus (43) may implement encryption and decryption modes of operation, which are based on the exemplary methods of FIGS. 2 and 3.

Figure 5:
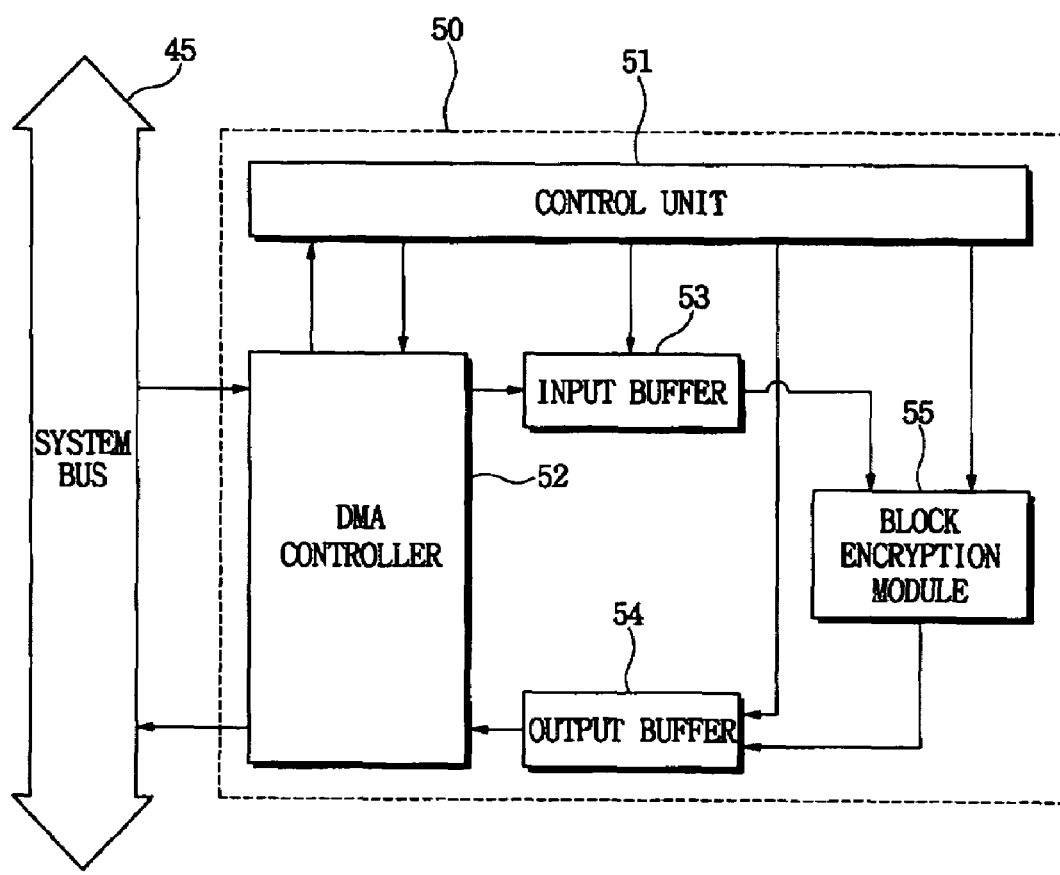
FIG. 5 is a schematic block diagram of a cryptographic system according to an exemplary embodiment of the invention, which may be implemented in the system of FIG. 4.

FIG. 5 is a diagram of a cryptographic system according to an exemplary embodiment of the invention. FIG. 5 illustrates a framework for the cryptographic apparatus (43) of FIG. 4, according to an exemplary embodiment of the invention. In FIG. 5, a cryptographic system (50), which is operatively connected to the system bus (45), comprises a control unit (51), a DMA controller (52), an input buffer (53), an output buffer (54), and a block encryption module (55). The control unit (51) generates control signals for controlling the various modules (52-55) of the cryptographic system (50) in response to, e.g., requests by the CPU (41) (FIG. 4) for executing one of a plurality of supported modes of operation. The CPU (41) provides cryptographic information such as, source addresses (SA) for data to be accessed from the memory (42) destination addresses (DA) for data to be written to the memory (42), data size, block size, a cryptographic key K, a key size, a direction (encryption and decryption), initial data (e.g., an initialization vector) and the mode of operation (e.g., CTR, CBC, etc.), for example, as further described below.

The DMA controller (52) writes/reads blocks of data (e.g., blocks of plaintext and ciphertext) to/from the memory (42). The DMA controller (52) stores one or more data blocks that are read from the memory (42) in the input buffer (53). The data block(s) stored in the input buffer (53) are transferred to the block encryption module (55) on a block-by-block basis. For example, if the block encryption module (55) supports a 128-bit cipher block algorithm (e.g., AES), the size of each block transferred from the input buffer (53) to the block encryption module (55) is 128 bits. Moreover, the DMA controller (52) stores in the memory (42) one or more data blocks that are stored in the output buffer (54). For example, the output buffer (54) stores encryption results (e.g., ciphertext) output from the block encryption module (55) and transfers such results to the DMA controller (52) under control of the control unit (51).

In one exemplary embodiment, the input buffer (53) and the output buffer (54) each comprise a First-In First-Out (FIFO) buffer, wherein the sizes of such buffers are at least double the block size implemented by the block encryption module (55). For example, if the block size is 128 bits, the input buffer (53) and output buffer (54) can store at least 256 bits each.

Figure 6:
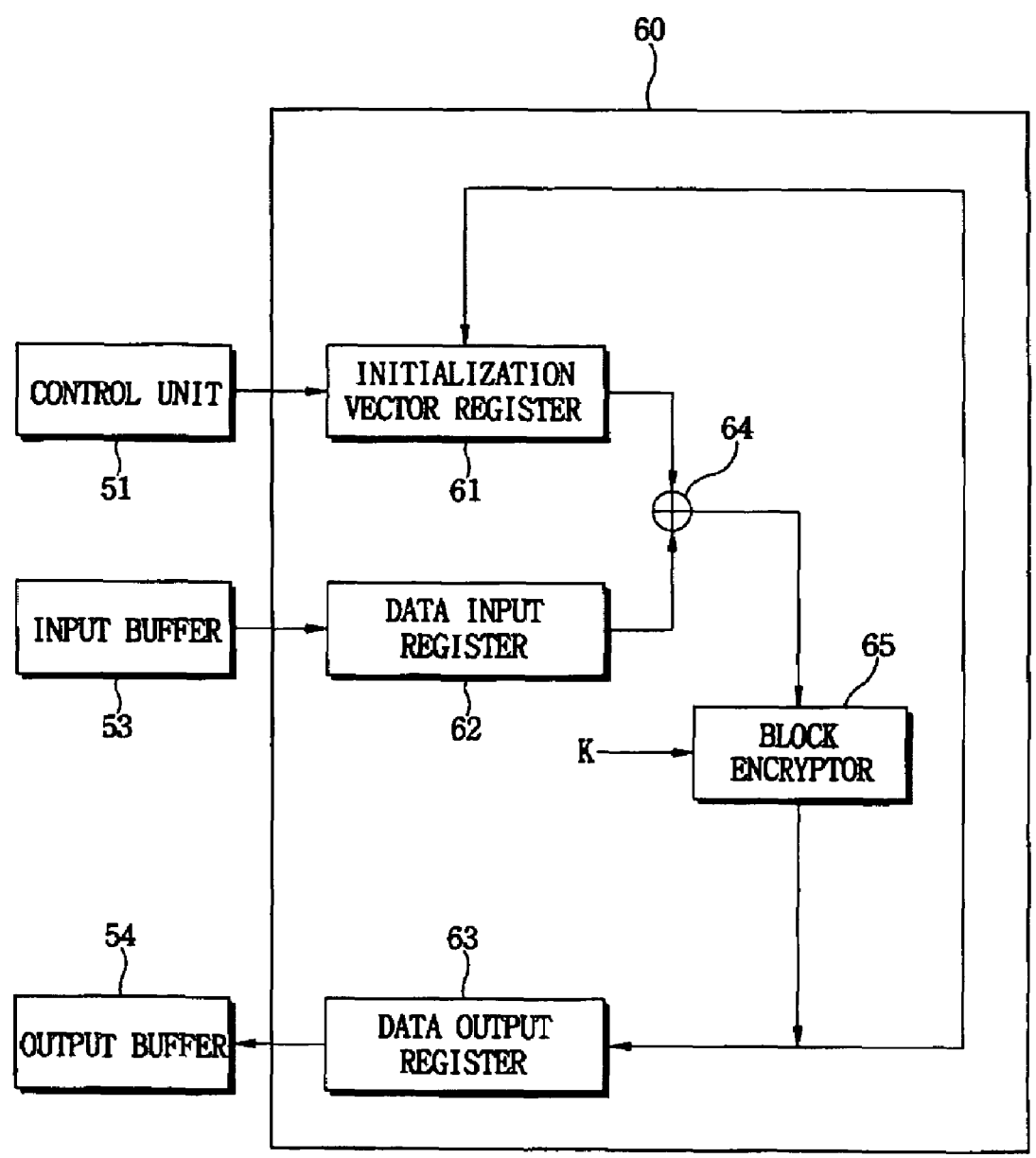
FIG. 6 is a schematic block diagram illustrating a block encryption module according to an exemplary embodiment of the invention.

Exemplary embodiments of the block encryption module (55) according to the invention, which support one or multiple modes of operation, such as CBC, CTR and/or CCM modes, will now be described in further detail with reference to the exemplary embodiments of FIGS. 6-10A and B. For example, FIG. 6 depicts an exemplary embodiment of the block encryption module (55) of FIG. 5. In particular, FIG. 6 depicts a block encryption module (60) according to an exemplary embodiment of the present invention, which can be implemented to support a CBC (cipher block chain) mode or a CBC-MAC mode. Referring to FIG. 6, a block encryption module (60) comprises an IV (initialization vector) register (61), a data input register (62), a data output register (63), an exclusive-OR (XOR) operator (64) and a block encryptor (65) (or block cipher).

The XOR operator (64) performs an XOR operation on a block of plaintext that is stored in the data input register (62) (which is input from the input buffer (53), FIG. 5, for example) and data (e.g., an initialization vector) that is stored in the IV register (61). In one exemplary embodiment of CBC mode, an initialization vector is stored in the IV register (61) by, e.g., the control unit (51) of FIG. 5, as initialization data to for starting the CBC mode. The result of the XOR operation is input to the block encryptor (65), which encrypts the XOR result using a cryptographic key, K, provided from the control unit (51), to generate a block of ciphertext. The block of ciphertext is output from the block encryptor (65) and then stored in the data output register (63) and/or the IV register (61), depending on the mode/application. For example, with a CBC mode, the block of ciphertext output from the block encryptor (65) can be stored in the data output register (63) and output to the output buffer (54). On the other hand, with a CBC-MAC mode (for CCM mode), the block of ciphertext output from the block encryptor (65) can be stored only in the IV register (61) to be used for encrypting a next data block that is input to the data input register (62) (although the ciphertext may also be stored in the data output register, depending on the implementation). Indeed, in CBC-MAC mode, the encryption result of all the blocks of plaintext (which are stored in memory (42), for example) will be accumulated in the IV register (61) whereby the final value in the IV register represents the MAC value. The MAC value is stored in the data output register (63) for output to the output buffer (54).

Figure 7:
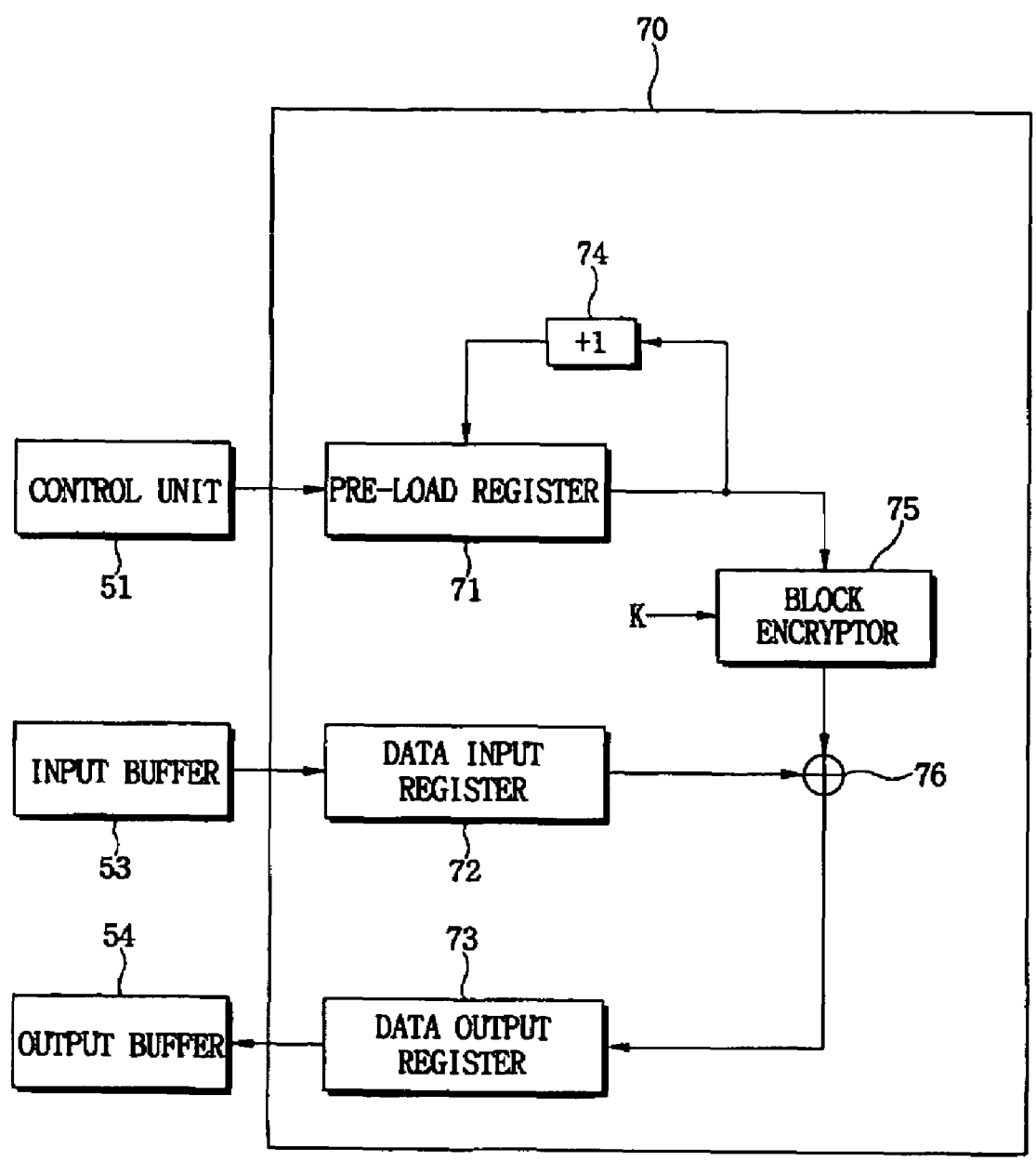
FIG. 7 is a schematic block diagram illustrating a block encryption module according to another exemplary embodiment of the invention.

FIG. 7 illustrates another exemplary embodiment of the block encryption module (55) of FIG. 5, which may be implemented in accordance with the invention. More specifically, FIG. 7 depicts a block encryption module (70) that supports a CTR mode according to an exemplary embodiment of the present invention. Referring to FIG. 7, a block encryption module (70) comprises a PL (pre-load) register (71), a data input register (72), a data output register (73), an adder (74), a block encryptor (75), and an XOR operator (76). To commence a CTR mode, initialization data provided from the control unit (51), for example, is stored in the PL register (71). The data input register (72) stores a block of data (e.g., plaintext or ciphertext), which is input from, e.g., the input buffer (53). The adder (74) adds "1" to the contents of the PL register (71) and the output of the adder (74) is stored in the PL register (71). The block encryptor (75) encrypts the data stored in the PL register (71) using a cryptographic key, K, provided from the control unit (51) of FIG. 5, for example. The XOR operator (76) performs an XOR operation on the output of the block encryptor (75) and the block of data (plaintext/ciphertext) that is stored in the data input register (72). The result of the XOR operation is stored in the data output register (73). Depending on the mode, the data stored in the data output register (73) can be a block of ciphertext (CTR encryption) or a block of plaintext (CTR decryption). The content of the data output register (75) is output to the output buffer (54) of FIG. 5, for example.

Figure 8:
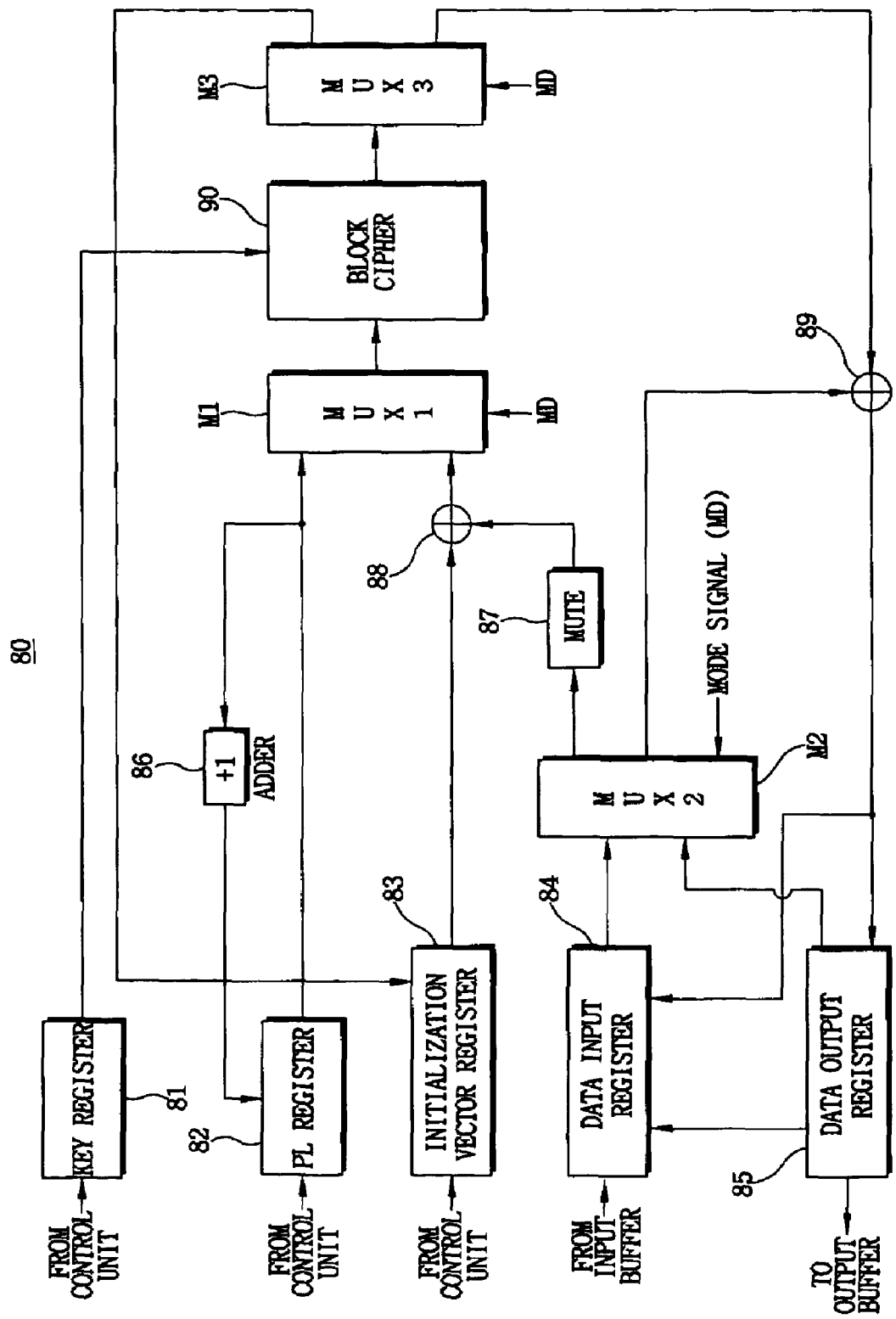
FIG. 8 is a schematic block diagram illustrating a block encryption module according to yet another exemplary embodiment of the invention.

In another embodiment of the invention, the block encryption module (55) of FIG. 5 comprises an architecture that supports multiple cryptographic modes. For example, FIG. 8 schematically illustrates a block encryption module (80) that supports multiple cryptographic modes including, CBC, CTR, and CCM modes according to exemplary embodiments of the invention. The block encryption module (80) comprises a key register (81), a counter PL (preload) register (82), an initialization vector (IV) register (83), a data input register (84), a data output register (85), an adder (86), a mute (padding) module (87), a plurality of XOR operators (88) and (89), a block cipher (90) (e.g., 128-bit AES), and a plurality of multiplexers (M1, M2 and M3). A controller (e.g., control unit (51) of FIG. 5) generates a mode signal (MD) that indicates the current mode of the block cipher (90). In one exemplary embodiment where the block cipher (90) independently supports CBC, CTR and CCM modes, the controller can generate a two-bit mode signal (MD) as a control signal that causes the system modules to operate in the specified mode accordingly. For example, the multiplexers (M1, M2 and M3) respond to the mode signal (MD) by selecting one of a plurality of inputs paths or output paths to transfer data to the appropriate modules depending on the specified mode. In one exemplary embodiment, a mode signal MD of '01' can indicate a CBC mode, "10" can indicate a CTR mode, and "11" can indicate a CCM mode. Moreover, the controller can store control information in a configuration register, wherein the control information comprises, e.g., a data block size, a key, a key size, a direction (encryption or decryption), an initialization vector, a mode (MD) and a PL value. The controller receives the control information from, e.g., the CPU (41) of FIG. 4.

The block encryption module (80) comprises an architecture that is based, in part, on the exemplary embodiments described above with reference to FIGS. 2-7, for example, to independently support CBC, CTR and CCM modes, wherein each module/components of the exemplary cryptographic system (80) is used for one or more of the supported modes. For example, in one exemplary mode of operation, the block encryption module (80) supports a CTR mode similar to that as described above with reference to FIG. 7. In another exemplary mode of operation, the block encryption module (80) supports a CBC mode similar to that as described above with reference to FIG. 6. Furthermore, in another exemplary mode of operation, the block encryption module (80) supports CTR and CBC-MAC modes for implementing a CCM mode, such as the exemplary CCM mode that will be described with reference to FIG. 9.

More specifically, in FIG. 8, a CTR mode of operation according to an embodiment of the invention is performed using the key register (81), the PL register (82), the data input register (84), the data output register (85), the adder (86), the XOR operator (89) and the block cipher module (90). A CTR mode is set by a CTR mode signal (MD) that is generated by, e.g., the control unit (51) of FIG. 5. The key register (81) stores a cryptographic key, K, which is received from the control unit and used by the block cipher module (90) to encrypt a block of data for CTR encryption or decryption modes The PL register (82) stores initial data provided from the controller (e.g., control unit (51)). The data input register (84) stores a block of plaintext to be encrypted or a block of ciphertext to be decrypted, which is received from, e.g., the input buffer (53) of FIG. 5. In a CTR mode of operation for processing a block of data, the data in the PL register (82) is encrypted by the block cipher module (90) using the cryptographic key in key register (81). The multiplexer (M1) is responsive to the CTR mode signal to transfer the output of the PL register (82) to the block cipher module (90).

Then, the encryption result (encrypted data) output from the block cipher module (90) is transferred to the XOR operator (89) via the multiplexer (M3) and a copy of the data block (plaintext/ciphertext block) in the data input register (84) is transferred to the XOR operator (89) via the multiplexer (M2). The XOR operator (89) performs an XOR operation on the encrypted data output from the block cipher module (90) and the data block from the data input register. The result of the XOR operation (result of CTR mode) is stored in the data output register (85). The PL register is increased by adding +1 (via adder (86)) to the previous output of the PL register (82) and storing the addition result in the PL register (82). The result of the CTR mode in the data output register (85) is output to, e.g., the output buffer (54) of FIG. 5.

In another embodiment of the invention, the block encryption module (80) performs a CBC mode of operation using the key register (81), the IV register (84), the data input register (84), the data output register (85), the XOR operator (88) and the block cipher module (90). More specifically, a mode signal (MD) is generated to set the module (80) to CBC mode. The XOR operator (88) performs an XOR operation on a block of plaintext that is stored in the data input register (84) and data (e.g., an initialization vector) that is stored in the IV register (83). The multiplexer (M2) is responsive to the CBC mode control signal (MD) to route the content of the data input register (84) to the XOR operator (88). An initialization vector is stored in the IV register (83) by, e.g., the control unit (51) of FIG. 5, as initialization data for the CBC mode. The result of the XOR operation is input to the block cipher module (90), which encrypts the XOR result using a cryptographic key, K, provided from the key register (81), to generate a block of ciphertext. The block of ciphertext is output from the block cipher module (90) and then routed by the multiplexer (M3) for storage in the IV register (83). The data content of the IV register (83) is copied to the data output register (85) for output to, e.g., the output buffer (54) of FIG. 5.

In yet another embodiment of the invention, the block encryption module (80) implements a CCM mode. For example, FIG. 9 is a flow diagram of a CCM mode of operation according to an exemplary embodiment of the invention, which can be implemented using the exemplary framework of FIG. 8. FIG. 9 illustrates a CCM mode of operation for one data block, i.e., a block of plaintext (encryption mode) or a block of ciphertext (decryption mode). In general, an exemplary CCM mode comprises performing a CTR mode followed by a CBC-MAC mode for a given data block. For purposes of discussion, the exemplary method of FIG. 9 will be described with further reference to FIG. 8, wherein it is assumed that a valid cryptographic key, K, is stored in the key register (81), that the PL register (82) and IV register (83) are loaded with initialization data or data input from a previous block encryption/decryption process, and that the data input register (84) is loaded with a data block (plaintext or ciphertext) that is being currently processed.

Initially, a CTR mode is set (step 91) by generating a CTR mode signal (MD). In CTR mode, the data in the PL register (82) is encrypted by the block cipher module (90) using the cryptographic key in key register (81) (step 92). The multiplexer (M1) is responsive to the CTR mode signal to transfer the output of the PL register (82) to the block cipher module (90). The encryption result (encrypted data) output from the block cipher module (90) is transferred to the XOR operator (89) via the multiplexer (M3) and a copy of the data block (plaintext block or ciphertext block) in the data input register (84) is transferred to the XOR operator (89) via the multiplexer (M2). The XOR operator (89) performs an XOR operation on the encrypted data output from the block cipher module (90) and the data block from the data input register (step 93). The result of the XOR operation (result of CTR mode) is stored in the data output register (85) (step 94). The PL register is increased (step 95) by adding +1 (via adder (86)) to the previous output of the PL register (82) and storing the addition result in the PL register (82).

Next, a CBC mode is set (step 96) by generating a CBC mode signal (MD). The process flow for CBC mode will vary depending on whether the CCM mode is an encryption mode (TX) or a decryption mode (RX) (step 97). Assuming CCM encryption mode, a CBC mode of operation comprises transferring the data block (plaintext block) in the data input register (84) to the XOR operator (88) via the multiplexer (M2). In this embodiment, it is to be appreciated that the plaintext data block for the CBC mode is already stored in the data input register (84) for the previous CTR mode, and does not have to be read from, e.g., the memory (42) of FIG. 4. An XOR operation is performed (step 100) on the plaintext data block and the data in the IV register (83). The result of the XOR operation is transferred to the block cipher module (90) via the multiplexer (M1), wherein the result of the XOR operation is encrypted (step 101). The encryption result (result of CBC mode) is then stored in the IV register (83) (step 102).

On the other hand, assuming a CCM decryption mode (step 97), the data block in the data output register (85) is copied to the data input register (84) (step 98). More specifically, in the exemplary embodiment of FIG. 9, since the data output register (85) contains a block of plaintext which is generated by CTR decryption of the input ciphertext block, the plaintext block generated by CTR decryption is used for the CBC mode (as opposed to reading the same plaintext block from memory). In other exemplary embodiments of the invention, the plaintext block resulting from CTR decryption can be copied directly into the data input register (84), or into both the data input and output registers (84), (85). In another embodiment, in CBC mode, the multiplexer (M2) is configured to selectively route the result of the CTR mode (the plaintext data block) stored in the data output register (85) to the XOR operator (88) for the CBC mode.

Figure 10A:
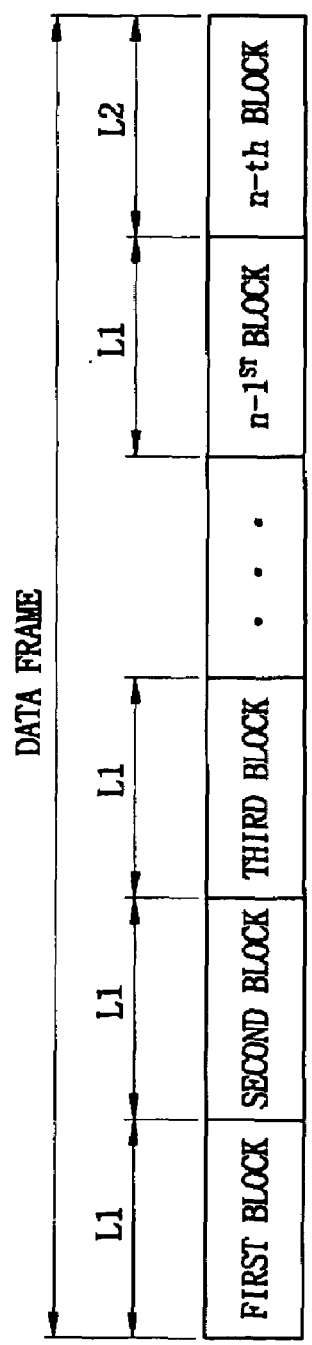
FIGS. 10A and 10B are exemplary diagrams that illustrate a method for zero-padding a data block according to an exemplary embodiment of the invention.
Figure 10B:
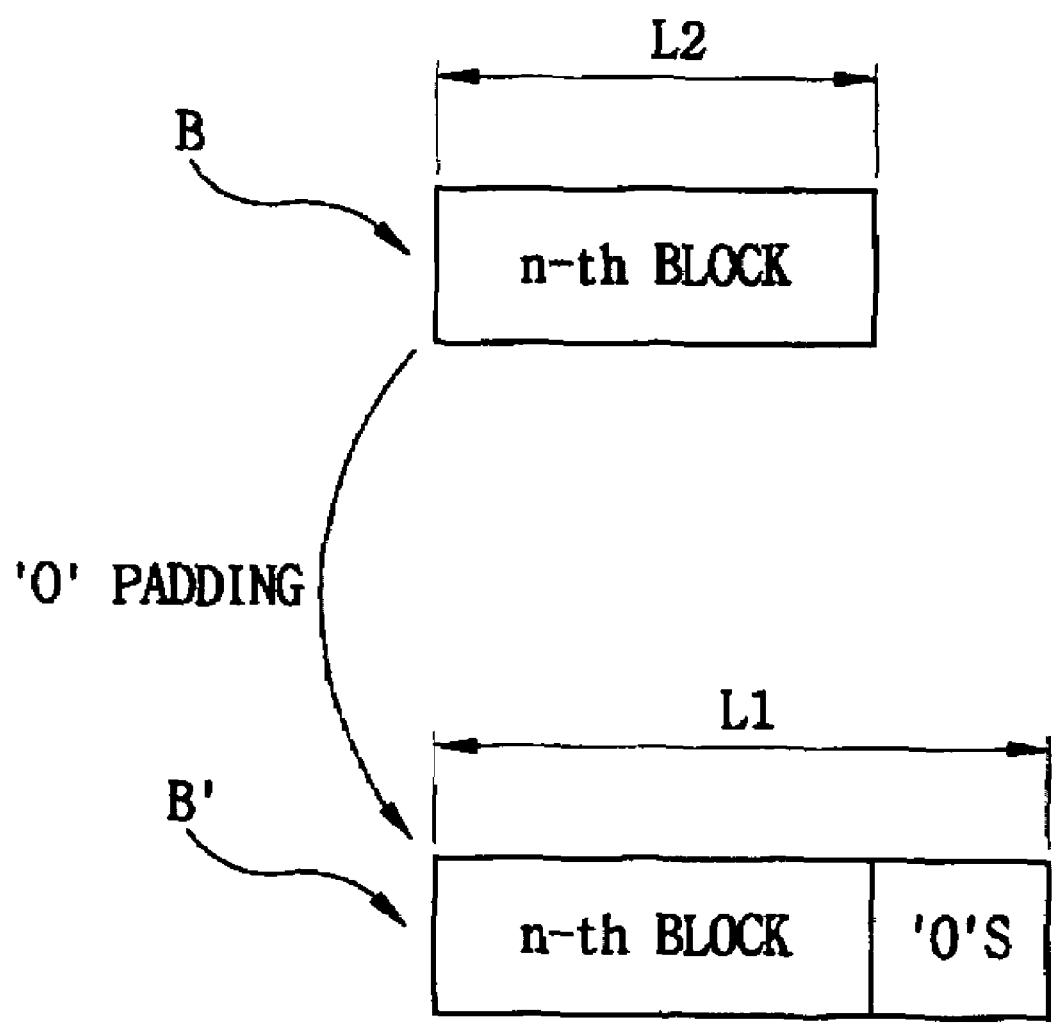

Next, the plaintext data block for the CBC mode can be muted (step 99) in circumstances where the plaintext data block needs to be padded with "0"s at the end of the block to make the data block size equal to the size of the block cipher. For example, FIGS. 10A and 10B illustrate a method for muting (or "padding") a data block, which can be implemented in the mute module (87) of FIG. 8. Referring to FIG. 10A, a Data Frame of, e.g., plaintext, is shown including a plurality of data blocks having a bit length, L1 equal to the block size of the block cipher, and a last block ($n^{th}$ block) having a bit length, L2, which is less than the block size of the block cipher. As illustrated in FIG. 10B, zero padding is performed to insert "0" bits to the end of the $n^{th}$ block (B) of block size L2, to thereby generate a padded $n^{th}$ block (B') having a block size equal to L1.

In the exemplary embodiment of FIG. 8, the muting module (87) can be used for "0" padding the plaintext block that results from CTR decryption, if needed. For example, "0" padding will be needed for "re-padding" a block of plaintext that is generated from a block of ciphertext which represents the original encrypted, zero-padded block of plaintext data. Accordingly, in step 99, the data block of plaintext will be "0" padded, if needed, to make the block size of such block of plaintext equal to L1.

Thereafter, the block of plaintext will be processed (steps 100, 101, and 102) as described above. In the exemplary method of FIG. 9, for CBC-MAC mode, the ciphertext block output from the block encryption module (90) (result of CBC mode) is stored in the IV register (83) (step 102) and used as input to encrypt the next message block. After the final data block is processed, the final value in the IV register (83) represents the MAC value, which is then copied to the data output register (85) for output to the output buffer (54).

It is to be appreciated that the block encryption module of FIG. 8 and associated CCM method of FIG. 1 are exemplary embodiments of the methods described above with reference to FIGS. 2 and 3. Indeed, in a CCM encryption mode based on the exemplary method of FIGS. 8 and 9, the same block of plaintext stored in the data input register (84) (or a buffer) is used for both CTR encryption and CBC-MAC, thereby eliminating the need to perform multiple memory read operations to access the plaintext block. Furthermore, in a CCM decryption mode, the plaintext block that results from CTR decryption is used for the following CBC-MAC mode, thereby eliminating the need to perform a memory read to access the block of plaintext. Moreover, the result of the CBC mode for a given block of data is accumulated in a buffer (as opposed to being written to memory), and used as an input to encrypt a next data block. After the last plaintext block is processed, the final accumulated value represents a MAC. Therefore, a CCM mode of operation based on the framework of FIGS. 8 and 9, for example, can provide more efficient CCM modes of operation as opposed to conventional methods.

Although exemplary embodiments have been described herein with reference to the accompanying drawings, it is to be understood that the invention is not limited to these exemplary embodiments and that various other changes and modifications may be affected therein by one skilled in the art without departing form the scope or spirit of the invention. All such changes and modifications are intended to be included within the scope of the invention as defined by the appended claims.

What is claimed is:

1. A method for encrypting data, comprising the steps of:
reading a plaintext data block from a memory;
storing the plaintext data block in an input buffer;
encrypting the plaintext data block in the input buffer using a first mode to generate a first cipher text;
storing the first ciphertext in an output buffer; and
encrypting the plaintext data block in the input buffer using a second mode to generate a second ciphertext.

2. The method of claim 1, wherein encryption is performed using CCM.

3. The method of claim 1, wherein the first mode comprises a CTR (counter) mode.

4. The method of claim 1, wherein the second mode comprises a CBC (cipher block chaining) mode.

5. The method of claim 1, further comprising the step of storing the second ciphertext in an initialization vector buffer.

6. The method of claim 1, further comprising the step of storing the second ciphertext in the output buffer.

7. A method for encrypting data in a block encryption module of a cryptographic system, comprising the steps of:
reading a plaintext data block from a memory external to the block encryption module;
storing the plaintext data block in an input buffer of the block encryption module;
encrypting the plaintext data block in the input buffer using a first mode to generate a first ciphertext;
storing the first ciphertext in an output buffer of the block encryption module; and
encrypting the plaintext data block in the input buffer using a second mode to generate a second ciphertext.

8. The method of claim 7, wherein encryption is performed using CCM, wherein the first mode comprises a CTR (counter) mode and wherein the second mode comprises a CBC (cipher block chaining) mode.

9. The method of claim 8, further comprising the step of storing the second ciphertext in an IV (initialization vector) buffer.

10. The method of claim 8, further comprising the step of storing the second ciphertext in the output buffer.

11. A cryptographic system, comprising:
means for reading a plaintext data block from a memory;
means for storing the plaintext data block in an input buffer;
means for encrypting the plaintext data block in the input buffer using a first mode to generate a first ciphertext;
means for storing the first ciphertext in an output buffer; and
means for encrypting the plaintext data block in the input buffer using a second mode to generate a second ciphertext.

12. The cryptographic system of claim 11, further comprising:
means for reading a ciphertext data block from the memory;
means for storing the ciphertext data block in the input buffer;
means for decrypting the ciphertext data block in the input buffer using a first mode to generate a plaintext;
means for storing the plaintext in the input buffer, an output buffer or both; and
means for encrypting the plaintext in the input buffer or the output buffer using a second mode to generate a ciphertext.

13. A program storage device readable by a machine, tangibly embodying a program of instructions executable by the machine to perform method steps for encrypting data, the method steps comprising:
reading a plaintext data block from a memory;
storing the plaintext data block in an input buffer;
encrypting the plaintext data block in the input buffer using a first mode to generate a first ciphertext;
storing the first ciphertext in an output buffer; and
encrypting the plaintext data block in the input buffer using a second mode to generate a second ciphertext.

* * * * *